United States Patent [19]
Rothchild

[11] 4,033,502
[45] July 5, 1977

[54] ECONOMICAL AND LABOR SAVING REINFORCING BAR COUPLER

[76] Inventor: Ronald D. Rothchild, 106 Rynda Road, South Orange, N.J. 07079

[22] Filed: June 26, 1975

[21] Appl. No.: 590,423

[52] U.S. Cl. ................................. 228/56; 164/54; 164/108; 228/241; 249/83
[51] Int. Cl.² ........................................ B23K 23/00
[58] Field of Search ............. 228/56, 241; 154/53, 154/54, 108, 110, 111, 333, 334, DIG. 12; 403/267, 272; 240/83

[56] References Cited
UNITED STATES PATENTS

| | | | |
|---|---|---|---|
| 3,192,080 | 6/1965 | Cooper | 164/333 X |
| 3,234,603 | 2/1966 | Leuthy et al. | 164/333 X |
| 3,255,498 | 6/1966 | Leuthy et al. | 64/111 X |
| 3,308,532 | 3/1967 | Long et al. | 28/241 |
| 3,638,978 | 2/1972 | Guntermann | 403/267 |
| 3,860,062 | 1/1975 | McMurray et al. | 64/333 |

Primary Examiner—Al Lawrence Smith
Assistant Examiner—K. J. Ramsey
Attorney, Agent, or Firm—Robert L. Nathans

[57] ABSTRACT

A coupling device is disclosed for rapidly and ecnomically mechanically joining a pair of elongated structural elements such as reinforcing bars in the field. The cylindrical coupling device includes an outer annular chamber containing porous substance which can be made to react exothermically, such as a mixture of aluminum and iron oxide powder which releases molten material, e.g. iron, upon being activated. The mass of exothermic material includes air in a quantity determined by the material's porosity when packed into the outer annular chamber. When the exothermic material is made to react, it heats the contained air and causes it to expand and act as a propellant, which causes molten iron from the exotheric reaction to be propelled from the outer chamber into an interior cylindrical chamber or chambers which contain the ends of the reinforcing bars. The flow speed and amount of propelled molten material deposited in the gap are regulated by: the dimensions of the passageways between inner and outer chambers, the radial clearance gap between the reinforcing bars and the inside surfaces of the inner chambers, and length of the inner chambers. When these parameters are properly adjusted, especially the size and number of passageways between outer and inner chambers, then molten material propelled into the radial clearance gap solidifies therein to produce solid masses of iron which funtcion as keying elements to join the reinforcing bars to the coupler.

28 Claims, 3 Drawing Figures

ECONOMICAL AND LABOR SAVING REINFORCING BAR COUPLER

BACKGROUND OF THE INVENTION

The present invention relates to the field of coupling devices for joining elongated structural elements together.

The patent to Leuthy et al. U. S. Pat. No. 3,234,603 illustrates a typical prior art method of butt splicing horizontally oriented reinforcing steel bars in the field. A crucible for containing exothermic powder is clamped to mold structure containing the elongated structural members by means of a clamping device. An exothermic reaction is thereafter produced in the crucible, and molten iron flows by gravity down into the mold cavity wherein it is solidified. The crucible and its associated clamping device must be thereafter removed and any sprues must be cut off. In other words, this technique causes molten metal to be produced in a separate external crucible and introduced into a mold cavity. See also U.S. Pat. No. 3,255,498 also to Leuthy et al. illustrating a somewhat different device for welding vertical oriented reinforcing bars.

Although the above-described method has been used for many years in the field, for butt splicing reinforcing bars, it suffers from numerous drawbacks. The powdered exothermic material is usually measured and mixed in the crucible after the crucible is clamped to the mold described hereinabove by means of relatively elaborate clamping devices. After the splicing process is completed, the crucible must be thereafter unclamped and removed from the reinforcing bars along with the mold. These crucibles are relatively expensive, costing in the neighborhood of $50.00 apiece and are subject to breakage. In addition, the time required to charge the crucible, clamp it to the mold, unclamp it, and clean it between uses, is wasteful in terms of labor. The above-mentioned disadvantage have been eliminated by virtue of the present invention as the invention does not require an external crucible, a crucible clamping device, or a mold. Furthermore, the above-mentioned measuring and mixing of exothermic material in the crucible is eliminated together with the safety hazard due to sparks and smoke produced at upper portions of the crucible. Also, the same coupler may be employed regardless of the orientation of the reinforcing bars to be joined, since it uses a propellant and functions independently of gravity. In summary, it is desirable to provide a rapidly actuated and laborsaving coupling device which is far less costly to use than the above-mentioned devies and results in greater safety together with the elimination of crucibles, different types of crucible clamping devices, and molds.

SUMMARY OF THE INVENTION

In accordance with a preferred embodiment of the present invention, a cylindrical coupling device is provided containing an outer annular chamber for storing porous exothermic material, which chamber communciates via passageways with a pair of inner cylindrical chambers, each receiving the end of a reinforcing bar therein with a small clearance gap between the inside surfaces of the inner chambers and the outside surfaces of the reinforcing bars. Upon igniting the porous exothermic material by means of a fuse, molten metal is propelled by virtue of the heated gas in the outer chamber through the passageways and through the above-mentioned clearance gaps to be solidified therein. The result is the production of the keying bodies within the inner chambers which couple each reinforcing bar to the cylindrical coupling device. The clearance gap and passageways are properly sized so that virtually no molten material is blown out of the coupling device to create a safety hazard in contrast with the above-mentioned method. Thus, crucibles, molds, and different types of coupling devices have been eliminated along with the labor cost of affixing and removing crucibles from the mold. The same coupler can assume any orientation, since gravity feed need not be relied on, as in the above-mentioned process. Additionally, the elimination of the costs relating to the use of the crucibles themselves, cleaning the crucibles, and the measuring and mixing of exothermic material therein is obtained. I estimate that at least 10-20 man minutes of labor per joint is saved through the use of my coupler.

Other objects, features, and advantages of the present invention will become apparent upon the perusal of the following description taken in conjunction with the figures in which:

FIG. 1 illustrates a first preferred embodiment of the invention;

FIG. 2 discloses a second preferred embodiment of the invention; and

FIG. 3 schematically illustrates a detail of a preferred reinforcing bar - coupler clearance gap.

DETAILED DESCRIPTION

Figure 1:
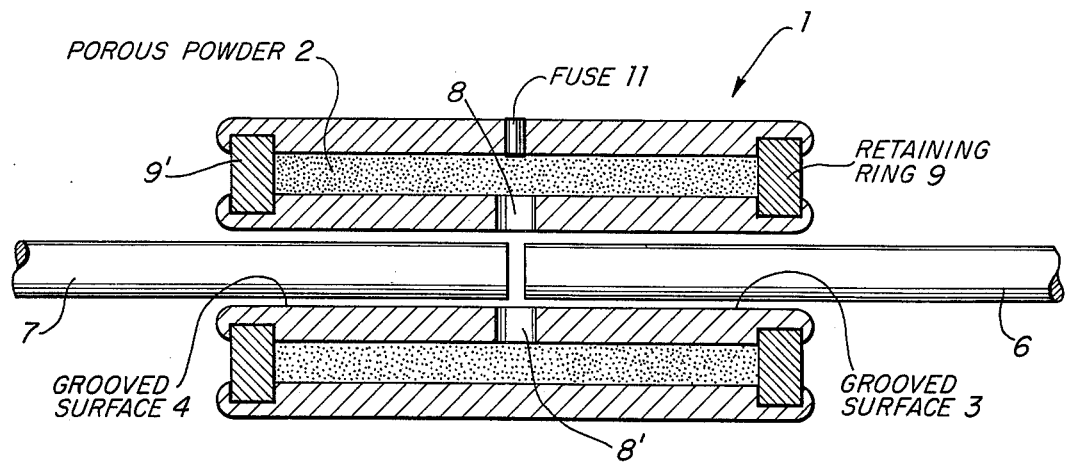
Figure 3:
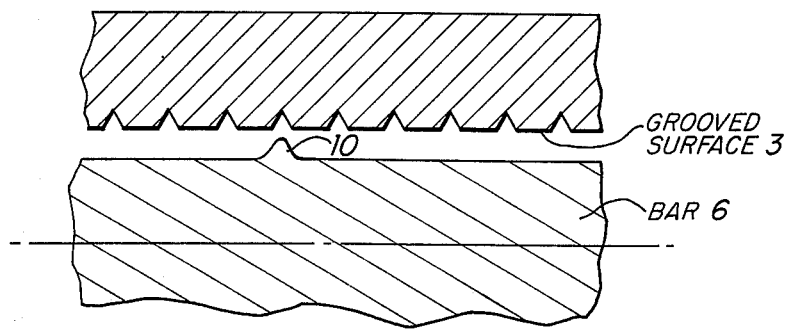

Referring now to FIG. 1, a cylindrical metallic coupling device 1 is disclosed having an outer annular chamber 2 formed therein which communicates with a first inner cylindrical chamber 3 and a second cylindrical inner chamber 4, each of which has an inside diameter which is slightly larger than the outside diameter of reinforcing bars 6 and 7 which are easily slid therein in the field. The dimensions of the cylindrical orifices or passageways 8 and 8', positioned between the outer annular chamber 2 and the first and second inner chambers 3 and 4, are selected to facilitate and regulate the propulsion of molten metal from the outer chamber 2 into the inner chambers 3 and 4 after the occurrence of the exothermic reaction within chamber 2. The inside surfaces of inner chambers 3 and 4 may be threaded or otherwise roughened or made uneven to produce an irregular or rough clearance gap as shown in FIG. 3 between the coupling device and the reinforcing bars. Preferably such reinforcing bars also have irregular ridges as is standard in the industry. Porous exothermic material is inserted into the outer annular chamber 2 by packing it therein by means of a press, for example. A mixture of aluminum powder and iron oxide has proven to provide excellent results, which mixture is marketed under the trademark "Thermite." After packing, a retaining ring 9 is fitted and fastened within the annular chamber so as to maintain the exothermic material therein. After being packed into annular chamber 2, the exothermic material may be characterized as a semisolid, annular, brittle body, being sufficiently porous so that upon being ignited by fuse 11, gas in its pores will be heated and cause molten iron to be propelled through orifices or passageways 8 and 8' and through major portions of the above-mentioned clearance gaps formed between the reinforcing bars and the inside grooved surfaces of the inner chambers 3 and 4. Grooved surfaces provide an economical method of improving the above-stated keying function.

The dimensions of the passageways 8 and 8' and the clearance gaps are selected so as to provide a fluid impedance to the propelled molten iron which is low enough so that molten iron is propelled through major portions of the lengths of the clearance gaps before solidifying. On the other hand, the passageways are not so large as to allow molten material to be blown away through the terminal portions of the coupler, to produce a safety hazard and also to often melt portions of the reinforcing bars, which is obviously undesirable. The solidified molten iron therefore functions as keying devices due to the threaded surface 5 and the conventional ridges 10 on the reinforcing bars. Since welding is not involved, impurity factors are no moment and no possible material-weld metal matching problems need be considered.

A first coupling device was constructed and tested by the inventor. An ordinary 1 inch diameter iron pipe was employed, having a length of 2 5/8 inches. The first coupler had the above-mentioned grooved surfaces formed by using a tap (7/16 – 14). The tapped hole had an inside diameter of about 0.41 inches. Number 3 reinforcing bars (nominal 3/8 inch diameter) was slid into the inner chambers 3 and 4 without jamming. The diameter of cylindrical passageways 8 and 8' were 15/64 inches. Ordinary "Thermite" powder was packed into the outer annular chamber by means of asserting my weight against the handle of a handpress. Retaining ring 9 was thereafter fitted into place and fastened. Fuse 11 was thereafter ignited, and molten iron was propelled by the resulting hot gas through orifices 8 and 8' and through portions of the clearance gaps, without being blown out of the terminal portions of the coupler. After soldifying a tensile strength test carried out by a testing laboratory indicated a tensile strength of 3,800 pounds.

Figure 2:
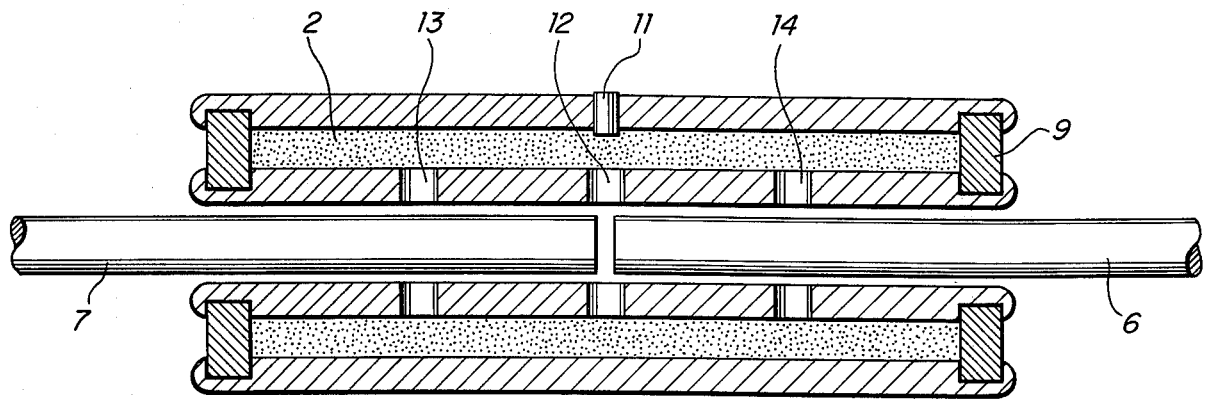

FIG. 2 illustrates a second coupler built by the inventor having three sets of cylindrical orifices or passageways between the outer annular chamber and the inner chambers which received the elongated structural members. Inner orifices 12 had a diameter of about 15/64 inches and outer orifices 13 and 14 had an inside diameter of about 3/16 to 1/8 inch. The dimensions of the clearance gaps and inner chamber diameters were similar to those of the embodiment of FIG. 1. The pipe sleeve length was about 2⅝ inches and the coupler was constructed of ordinary 1 inch diameter iron pipe. The use of three sets of passageways rather than one set insures that molten iron fills major portions of the clearance gap. The more complete filling of the FIG. 2 clearance gaps, due to the greater number of orifices, produced a couler having a greater tensile strength than the FIG. 1 embodiment. The coupler constructed and tested in accordance with the teachings of FIG. 2 had a tensile strength of over 6,000 pounds.

It should now be appreciated that a novel coupler for elongated structural members such as reinforcing bars has been provided, which coupler may be made of ordinary iron pipe and is very inexpensive to make since accurate machine tolerances are not generally required. The above-mentioned crucibles with the associated clamping devices and the cost of labor in connection with their use has been eliminated. My novel coupling device may be oriented in any position since gravity flow employed in connection with the use of crucibles is eliminated. Since molten material is not blown out of the coupler, a safe and smokeless device is provided. In contrast with the 10 to 20 man minutes required through the use of the crucible technique, the use of my coupler takes about one man minute per joint.

The joining of larger structural members would probably require even longer coupling devices having more orifices between the outer annular chamber and the inner chambers so as to provide more elongated keying elements for greater strength. In view of the above teachings, it is obviously a matter of routine engineering experimentation to provide satisfactory orifice diameters and associated clearance gaps for any size structural member. A major point is that the larger the number and dimensions of orifices, the greater the tendency of the molten iron to be blown out of the terminal portions of the coupler; conversely, if the number and dimensions of orifices are too small, it is possible that the insignificant molten material will be introduced into the clearance gaps, which tends to weaken the bonds between the structural elements and the coupler.

While the use of a porous exothermic material is preferred, it may be feasible to employ solid material which after being ignited is propelled through the orifices by means of a gas charge chamber associated with the fuse. Although cylindrical configurations are preferred, it is quite possible that structural elements having other cross sections such as squares may be fitted within inner chambers which have cross sections in the form of the squares. While the invention is particularly suitable to joining reinforcing bars, obviously other elongated structural elements may be joined by my coupler. It is believed feasible to eliminate the outer chamber and passageways by positioning the powder between the abutting reinforcing bars within a first and second chamber. The "width" of the structural member is intended to mean the diameter of a cylindrical structural member or the minor dimension of a square or other shaped member. Numerous exothermic metal producing materials are suitable such as those enumerated in col. 6 of U.S. Pat. No. 3,255,498 to Leuthy. The coupling of a single bar to the coupler is believed useful for attaching end plates to the coupler at cement surfaces. Hence, the term "members" is intended to mean one or more members.

While preferred devices of the invention have been described, the teachings of this invention will readily suggest many other devices to those skilled in the art. Scope of invention is only limited by claims.

I claim:

1. A non-removable coupling device which eliminates the need for external crucibles or removable molds for coupling together first and second elongated structural members, such as reinforcing bars, comprising:

a. a first annular chamber portion formed completely within said coupling device containing means for releasing under pressure molten material upon being activated; and b. a second chamber portion disposed centrally within said first chamber portion and opened to the atmosphere and communicating with said first chamber portion for receiving said first and second elongated structural members and said molten material therein, the width of said second chamber portion being slightly larger than the corresponding width of said elongated structural members to form a clearance gap between said elongated structural members and said coupling device for receiving said molten material.

2. The coupling device of claim 1 wherein said clearance gap is sufficiently large to permit significant portions of said molten material produced in said first chamber to enter said clearance gap before being solidified therein.

3. The coupling device of claim 2 wherein said clearance gap is not so large as to permit significant portions of said molten material to be blown out of said coupling device through said clearance gap.

4. The coupling device of claim 3 wherein said means for releasing includes a porous substance for producing an exothermic reaction.

5. The coupling device of claim 4 wherein said porous substance is a mixture of aluminum and iron oxide.

6. The coupling device of claim 4 wherein said second chamber has a threaded surface so that said molten material is more effective in its keying function.

7. The coupling device of claim 2 wherein said means for releasing includes a porous substance for producing an exothermic reaction.

8. The coupling device of claim 7 wheren said porous substance is a mixture of aluminum and iron oxide.

9. The coupling device of claim 1 wherein said means for releasing includes a porous substance for producing an exothermic reaction.

10. The coupling device of claim 9 wherein said porous substance is a mixture of aluminum and iron oxide.

11. The coupling device of claim 1 wherein said means for releasing molten material includes a mixture of aluminum and iron oxide.

12. A non-removable coupling device which eliminates the need for external crucibles or removable molds for coupling together first and second elongated structural members, such as reinforcing bars, comprising:
 a. an annular elongated outer chamber closed to the atomsphere and formed within said coupling device containing an exothermic substance which releases under pressure molten material upon being activated;
 b. an elongated inner chamber disposed centrally within said annular elongated outer chamber and open to the atmosphere and having an outer wall for receiving said frist and second elongated structural members, the width of said inner chamber being slightly greater than the corresponding width of said elongated structural members to produce a clearance gap between said structural member and said outer wall; and
 c. orifice means formed within said outer wall and communicating between said outer chamber and said inner chamber for allowing molten material to be propelled from said outer chamber into said clearance gap to produce a solid body between said elongated structural members and said outer wall.

13. The coupling device set forth in claim 12 wherein said substance is porous to enable heated gas to propel said molten material through said orifice means.

14. The coupling device set forth in claim 13 wherein said substances is a mixture of aluminum and iron oxide.

15. The coupling devide of claim 13 wherein said clearance gap and orifice means are large enough to receive significant amounts of molten material therein but not so large as to permit great amounts of said molten material to escape from said coupler through said gap.

16. The coupling device of claim 12 wherein said orifice means and gap are large enough to cause significant amounts of molten material to enter said gap but not so large as to permit significant amounts of said molten material to escape from said coupling device through said clearance gap.

17. The coupling device of claim 16 wherein said orifice means includes a plurality of passageways formed between said outer chamber and said inner chamber.

18. The coupling device of claim 16 wherein the outer wall of said inner chamber has an irregular surface to improve the keying effect of the solidified material formed within said clearance gap.

19. The coupling device of claim 12 wherein the dimensions of said orifice means are great enough to enable substantial quantities of said molten material produced in said outer chamber to pass through significant portions of said clearance gap before solidifying.

20. The coupling device of claim 17 wherein the outer wall of said inner chamber has an irregular surface to improve the keying effect of the solidified material formed within said clearance gap.

21. A cylindrical coupling device for joining first and second elongated cylindrical structural members such as reinforcing bars comprising:
 a. an outer annular chamber formed within said coupling device containing a substance which releases molten material upon being activated;
 b. a first inner cylindrical chamber, communicating with said outer chamber through orifice means, for receiving a first cylindrical structural member, the diameter of said inner annular chamber being slightly larger than the diameter of said first cylindrical structural member to form a first clearance gap between said coupling device and said first cylindrical structural member which is large enough to permit significant quantities of molten material to pass through said first gap and not so large as to permit significant quantities of said molten material to be blown out of said coupling device through said first clearance gap; and
 c. a second inner cylindrical chamber, communicating with said outer chamber through orifice means, for receiving a second cylindrical structural member, the diameter of said second inner cylindrical chamber being slightly larger than the diameter of said second cylindrical member to form a second clearance gap between said coupling device and said second cylindrical structural member, said second gap being large enough to permit significant quantities of molten material to pass through said second gap and not so large as to permit significant quantities of said molten material to be blown out of said coupling device through said clearance gap.

22. The coupling device of claim 21 wherein said orifice means includes a first passageway positioned between said outer chamber and said first inner chamber and a second passageway positioned between said outer chamber and said second inner chamber.

23. The coupling device of claim 22 wherein said substance is porous to enable heated gas to propel heated molten material through said orifice means and through significant portions of said clearance gap.

24. The coupling device of claim 22 wherein said inner cylindrical chambers have inner surfaces of irregular configuration.

25. The coupling device of claim 21 wherein said inner cylindrical chambers have inner surfaces of irregular configuration.

26. The coupling device of claim 21 wherein said substance is porous to enable heated gas to propel heated molten material through said orifice means and through significant portions of said clearance gap.

27. The coupling device of claim 26 wherein said orifice means includes a first passageway positioned between said outer chamber and said first inner chamber and a second passageway positioned between said outer chamber and said second inner chamber.

28. The coupling device of claim 26 wheren said inner cylindrical chambers have inner surfaces of irregular configuration.

* * * * *